United States Patent [19]
Padgett et al.

[11] Patent Number: 5,930,813
[45] Date of Patent: *Jul. 27, 1999

[54] METHOD AND SYSTEM FOR DESIGNATING OBJECTS

[75] Inventors: Allan P. Padgett, Menlo Park; Steven I. Herskovitz, San Carlos, both of Calif.

[73] Assignee: Adobe Systems Incorporated, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/576,504

[22] Filed: Dec. 21, 1995

[51] Int. Cl.$^6$ .................................................. G06F 17/24
[52] U.S. Cl. ......................................... 707/539; 707/540
[58] Field of Search .................................. 395/802, 803, 395/134, 135; 707/539, 540; 345/434, 435

[56] References Cited

U.S. PATENT DOCUMENTS

| | | | |
|---|---|---|---|
| 4,622,545 | 11/1986 | Atkinson | 345/191 |
| 5,261,032 | 11/1993 | Rocchetti et al. | 395/141 |
| 5,367,625 | 11/1994 | Ishitani | 395/133 |
| 5,442,736 | 8/1995 | Cummins | 395/134 |
| 5,459,831 | 10/1995 | Brewer et al. | 395/356 |
| 5,479,596 | 12/1995 | Capps et al. | 395/802 |
| 5,504,842 | 4/1996 | Gentile | 395/114 |
| 5,574,835 | 11/1996 | Duluk, Jr. et al. | 395/121 |
| 5,600,768 | 2/1997 | Andresen | 395/135 |
| 5,617,114 | 4/1997 | Bier et al. | 345/113 |
| 5,638,498 | 6/1997 | Tyler et al. | 395/117 |
| 5,664,210 | 9/1997 | Fleming et al. | 707/531 |
| 5,694,151 | 12/1997 | Johnston, Jr. et al. | 345/145 |

FOREIGN PATENT DOCUMENTS

| | | |
|---|---|---|
| 0 434 930 A2 | 7/1991 | European Pat. Off. . |
| 0 459 711 A2 | 12/1991 | European Pat. Off. . |
| 0 543 599 A2 | 5/1993 | European Pat. Off. . |
| 0 566 294 A2 | 10/1993 | European Pat. Off. . |
| 0 627 701 A2 | 12/1994 | European Pat. Off. . |

OTHER PUBLICATIONS

*Inside Macintosh*, Promotional Edition, Apple Computer, Inc., "Quick Draw: A Programmer's Guide", pp. 45–61, Mar. 1983.

*Primary Examiner*—Stephen S. Hong
*Attorney, Agent, or Firm*—Fish & Richardson P.C.

[57] ABSTRACT

An improved technique for highlighting text objects accurately, reliably and quickly is disclosed. The technique minimizes the number of expensive region operations required to produce the necessary highlighting by combining bounding boxes of adjacent objects (e.g., words) using rectangle operations. The resulting rectangles are then used to form a region. The complexity of the regions is limited by limiting the number of rectangles that can be included within a region. Once a region is formed, the pixels of a display screen that are within the region are inverted to designate the objects within the region. However, before inverting the pixels, any overlap of the region with a previously highlighted region is eliminated or clipped from the region. The portion of overlap can be determined by rectangle operations instead of expensive region operations. As a result, double inverts which have plagued highlighting of having objects that can be placed at any position or rotation are eliminated in an efficient manner.

8 Claims, 7 Drawing Sheets

METHOD AND SYSTEM FOR DESIGNATING OBJECTS

BACKGROUND OF THE INVENTION

1. Field of the Invention

The invention relates generally to a method of designating objects visually appearing on a computer monitor during operation of computer application programs, and more particularly, to a method of highlighting objects appearing in a non-linear format.

2. Description of the Related Art

The majority of computer application programs generate data and then output that data to a user as objects (i.e., alpha-numeric characters or graphical objects) appearing visually on a computer monitor. It is often desirable to allow the user to quickly and efficiently manipulate the data generated by the computer program and then output the manipulated data to the user via the computer monitor. For example, in text processor programs, it is desirable to allow the user to designate certain portions of text and then change that designated text by performing stylistic operations such as bolding, underlining, or italicizing. Similarly, in spreadsheet programs, it is desirable to allow the user to designate certain numbers and then change those designated numbers by performing mathematical or statistical operations. Also, in graphic programs, it is desirable to allow the user to designate certain graphical objects and then change those designated objects by performing rotate, invert, move, or similar operations. Generally, an important feature of many computer application programs is the ease with which the user can quickly and efficiently designate data for subsequent manipulation.

The designation process is usually accomplished by moving a cursor to different portions on the visual output of the computer monitor, with the cursor position used to designate the point of data entry. The cursor is a position indicator which is visually displayed on the computer monitor. The cursor can be positioned by a user using many different input devices, including keyboards, "mice", track balls or styluses.

Different visual methods are used by computer application programs to delineate objects (i.e., alpha-numeric characters, graphic objects, or other like items) for manipulation. For example, the application program can change the intensity of the designated objects to highlight either the designated area or the surrounding area. Also, the application program can change the color of the designated objects to differ from the background in surrounding areas. Alternatively, the program can cause the designated objects to "blink" and thereby distinguish those objects from the surrounding area.

A common method used to delineate selected objects is to highlight them using an "invert" operation. Inverting is a graphic operation performed on a set of pixels on the computer monitor. That set may include only one pixel, all of the pixels inside a rectangle, or any possibly disconnected set of areas of the computer monitor. Inverting a pixel "reverses" its color. Thus, black pixels become white, and white pixels become black. Every color has its own "reverse" color as well. Inverting has a number of properties which make it well suited to object highlighting. First, it produces high-contrast results, making it easy to see what is highlighted. Second, it is reversible, since inverting an area of the computer monitor twice results in the original set of colors. Finally, it is applied to objects that have already been drawn, without requiring that the highlighted object be redrawn when it is selected or de-selected. The combination of the later two properties are important because redrawing the objects is often unacceptably slow.

There exists today two standard invert-based techniques used by application programs to highlight objects on the computer monitor. These techniques are described in detail below.

For most application programs, a simple technique can be used to highlight all of the selected objects using inverting. The simple technique operates as follows: For each object, calculate an area which encloses the object and invert that area. For n objects, this results in n highlighted areas on the computer monitor, without having to redraw the selected objects. Most existing text processors and spreadsheets use this technique to highlight selected words. For each word to be highlighted, the text processor first determines the "bounding box" of the word. The bounding box is the possibly rotated rectangle that encloses the word on the screen. This bounding box is then inverted and the next word is processed.

The simple technique, however, will fail if it is possible for the area enclosing one object to overlap with the area enclosing another object. In this case some pixels may be inverted more than once, resulting in inaccurate highlighting. This is often referred to as the "double invert" problem. Specifically, if two objects have overlapping areas, the pixels which are common to both objects will be inverted twice. This results in an area which appears to be unselected, and if the objects overlap significantly, neither object will appear selected at all. Conventional text processors as described above have a number of qualities which prevent this problem. Specifically, the conventional text processors have extensive knowledge and control over the relative position of words and characters in the document, and they require that the text be placed in linear, horizontal positions with no rotated or overlapping text. The net result of these limitations is that no bounding boxes overlap, thereby allowing the conventional text processors to avoid "double inverts."

More complicated object processing application programs allow arbitrarily positioned and rotated objects and overlapping bounding boxes. Highlighting in these types of applications, therefore, cannot be accurately performed using the simple technique described above. Instead, these application programs traditionally use a second technique that requires the use of a powerful geometric object called a "region." Like rectangles, a region defines a set of pixels on the computer monitor. Regions, however, can define any combination of pixels, including disjoint and non-rectangular areas. Specifically, a single region can be created that contains exactly the same pixels as the combination of any number of rectangles. Such a region is created by using a "union" operation. The union of two regions is a new region which contains all of the pixels in either region, including pixels which are in both regions. Thus, if an application program can create a series of regions which enclose each object to be highlighted, then a single region can be formed that contains every pixel that should be inverted on the computer monitor.

By using region operations, the second technique can accurately highlight any set of objects on the screen. The second technique operates as follows. Start with an empty region X. For each object to be highlighted, create a temporary region that encloses the object. This region, for example, might just be the region which contains the same pixels as the object's bounding box. Next, union this temporary region with region X, and replace X with the result of the union. Repeat these steps for each object to be highlighted. Finally, invert region X once and all of the objects get highlighted at once, with no possibility of double inverts.

While this second technique has been used by application programs to produce accurate highlighting, it suffers two major deficiencies, both relating to the fact that it depends on region operations. First, the second technique might fail in practice because region operations require a great deal of memory resources of the computer system. This can lead to low-memory situations where a region union or region invert could in fact fail completely, resulting in inaccurate or non-existent highlighting. In the worst case, this could lead to a system crash. Second, the second technique can be extremely slow in practice because region operations themselves are slow. Further, as a region gets more complex, the time required to perform an operation on it increases greatly. Hence, when the objects to be highlighted are complex and/or numerous, the performance of the second technique can become unusable, even on the fastest of computers.

Thus, existing methods of highlighting text cannot highlight overlapping or non-linear text in a fast, reliable and efficient manner without double inverts. Use of bounding rectangles allows a fast and efficient highlight operation, but often results in double inverts. Similarly, use of a single bounding region to highlight text prevents double inverts, but cannot perform the operation in a fast and efficient manner. A need exists for a fast, reliable and efficient method to highlight overlapping or rotated text without incurring any double inverts.

SUMMARY OF THE INVENTION

Broadly speaking, the invention is an improved technique for designating (i.e., highlighting) objects accurately, reliably and quickly. The technique according to the invention minimizes the number of expensive region operations required to produce the necessary designating (i.e., highlighting). More particularly, the technique combines bounding boxes of adjacent objects (e.g., words) to the extent possible using rectangle operations, thereby allowing multiple objects to be represented as a single rectangle. The resulting rectangles are then used to form a region. The complexity of the region is limited by limiting the number of rectangles that can be included within it. By limiting the complexity of regions, the demand for system resources is controlled so that lack of sufficient memory resources will not cause inaccurate or failed designation. Once a region is formed, the pixels of a display screen that are within the region are inverted to designate the objects within the region. However, before inverting the pixels, any overlap of the region with a previously designated region is eliminated or clipped from the region. As a result, double inverts, which have plagued highlighting of files (e.g., portable electronic document files) having objects that can be placed at any position or rotation, are eliminated in an efficient manner. In addition, the improved technique according to the invention is able to bypass the processing of objects to be designated which are not currently visible on the screen.

The invention can be implemented in numerous ways, including as a method, a system, or a computer readable medium.

As a computer-implemented method for designating objects on a display screen of a computer system, an embodiment of the invention includes the operations of: receiving a plurality of objects to be designated on the display screen; determining bounding boxes for each of the objects; combining certain of the adjacent bounding boxes; subsequent to the combining, forming a region with the bounding boxes; removing from the region that portion which overlaps with one or more of the previously inverted regions; and designating the region so as to designate the objects within the region.

Optionally, the embodiment of the invention also designates the objects one region at a time, with the region holding up to a predetermined maximum number of bounding boxes, and forms the region with a sequence of the bounding boxes. It is preferred that the objects being designated are words and that the designation operates to highlight the words.

As a computer-implemented method for highlighting text, another embodiment of the invention includes the operations of: receiving a word range of text to be highlighted; providing a graphical region; obtaining a word within the word range of text to be highlighted; determining a bounding rectangle for the word; determining if the bounding rectangle should be combined with a previous bounding rectangle; combining the bounding rectangle with the previous bounding rectangle when the determining operation determines that they should be combined; adding the bounding rectangle to the region when the determining operation determines that they should not be combined; repeating the obtaining through the adding operations until either a predetermined number of rectangles has been added to the region or all the words in the word range have been processed; and subsequently inverting the region thereby producing the highlighted text.

As a system for designating objects on a display screen of a computer system, an embodiment of the invention includes: a portable electronic document file containing a plurality of objects to be designated on the display screen; a bounding box builder for determining bounding boxes for each of the objects; a bounding box combiner for combining certain of the adjacent bounding boxes; a region builder for forming a region from the bounding boxes; an overlap clipper for removing from the region that portion which overlaps with one or more of the previous regions; and an designator for modifying pixels on the display screen that are within the region, thereby designating the objects.

As a computer readable medium containing program instructions for designating objects on a display screen of a computer system, an embodiment of the invention includes: computer readable code for receiving a plurality of objects to be designated on the display screen; computer readable code for determining bounding boxes for each of the objects; computer readable code for combining certain of the adjacent bounding boxes; computer readable code for forming a region with the bounding boxes; computer readable code for removing from the region that portion which overlaps with one or more of the previously inverted regions; and computer readable code for inverting the region, thereby designating the objects within the region.

As a computer readable medium containing program instructions for highlighting text, another embodiment of the invention includes: first computer readable code for receiving a word range of text to be highlighted; second computer readable code for providing a graphical region; third computer readable code for obtaining a word within the word range of text to be highlighted; fourth computer readable code for determining a bounding rectangle for the word; fifth computer readable code for determining if the bounding rectangle should be combined with a previous bounding rectangle; sixth computer readable code for combining the bounding rectangle with the previous bounding rectangle when the fifth computer readable code determines that they should be combined; seventh computer readable code devices for adding the bounding rectangle to the region when fifth computer readable code determines that they should not be combined; eighth computer readable code for repeating the third through the seventh computer readable code until either a predetermined number of rectangles has been added to the region or all the words in the word range have been processed; and ninth computer readable code for inverting the region, thereby producing the highlighted text.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF THE INVENTION

Embodiments of the invention are discussed below with reference to the drawings. However, those skilled in the art will readily appreciate that the detailed description given herein with respect to these figures is for explanatory purposes as the invention extends beyond these limited embodiments.

The invention provides an improved technique for designating (i.e., highlighting) text objects accurately, reliably and quickly. The technique according to the invention minimizes the number of expensive region operations required to produce the necessary designating (i.e., highlighting). This is achieved by combining bounding boxes of adjacent objects (e.g., words) to the extent possible using rectangle operations, thereby allowing multiple objects to be represented as a single rectangle. The resulting rectangles are then used to form a region. The complexity of the regions is limited by limiting the number of rectangles that can be included within a region. By limiting the complexity of regions, the demand for system resources is controlled so that lack of sufficient memory resources will not cause inaccurate or failed designation. Once a region is formed, the pixels of a display screen that are associated with the region are inverted to designate the objects within the region. However, before inverting the pixels, any overlap of the region with a previously designated region is eliminated or clipped from the region. The portion of overlap can be determined by rectangle operations instead of expensive region operations. As a result, double inverts which have plagued highlighting of files (e.g., portable electronic document files) having objects that can be placed at any position or rotation are eliminated in an efficient manner. Experiments have shown that highlighting of such files is sped up by a factor of ten to one-thousand times by the invention. In addition, the improved techniques according to the invention are able to bypass the processing of objects to be designated which are not currently visible on the screen. Furthermore, error handling can also be implemented to catch low system resource conditions in which case the complexity of the regions can be reduced and the processing again tried.

A rectangle is a common graphics object that represents only an unrotated right quadrilateral. Rectangle operations include intersection, union and invert which are all very fast and require minimal system resources. Unlike rectangle operations, region operations are considerably slower and require substantially greater system resources. Further, region operations (union, intersection, invert) get increasingly slower and more costly as the region gets more complex. Regions, no matter how complex, also have a bounding rectangle.

Figure 1:
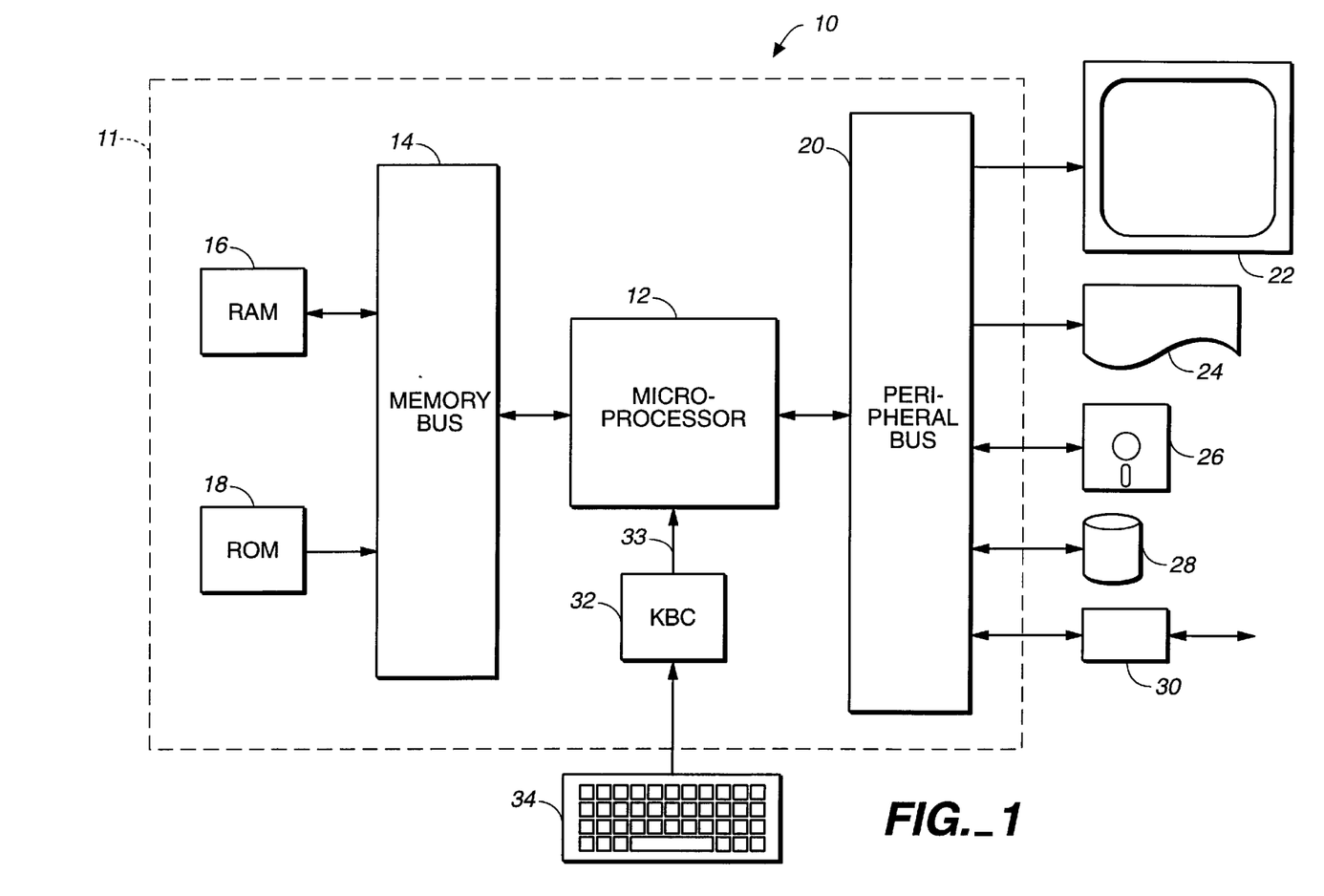
FIG. 1 is a block diagram of a exemplary computer system in accordance with an embodiment of the invention.

FIG. 1 is a block diagram of an exemplary computer system 10 for designating objects in accordance with the invention. The computer system 10 includes a digital computer 11, a display screen (or monitor) 22, a printer 24, a floppy disk drive 26, a hard disk drive 28, a network interface 30, and a keyboard 34. The digital computer 11 includes a microprocessor 12, a memory bus 14, random access memory (RAM) 16, read only memory (ROM) 18, a peripheral bus 20, and a keyboard controller 32. The digital computer 11 can be a personal computer (such as an IBM compatible personal computer), a workstation computer (such as a SUN or Hewlett-Packard workstation), or some other type of computer.

The microprocessor 12 is a general purpose digital processor which controls the operation of the computer system 10. The microprocessor 12 can be a single-chip processor or can be implemented with multiple components. Using instructions retrieved from memory, the microprocessor 12 controls the reception and manipulation of input data and the output and display of data on output devices. In the described embodiment, a function of microprocessor 12 is to examine a range of objects (e.g., words) to be designated (e.g., highlighted), group bounding boxes of certain adjacent objects, avoid double inverts, and invert the objects to designate the objects.

The memory bus 14 is used by the microprocessor 12 to access the RAM 16 and the ROM 18. The RAM 16 is used by the microprocessor 12 as a general storage area and as scratch-pad memory, and can also be used to store input data and processed data. The ROM 18 can be used to store instructions followed by the microprocessor 12 as well as image descriptions and character outlines used to display images in a specific format. For example, input data from a file can be in the form of PostScript® or other page description language character codes to represent characters. The characters' associated character outlines can be retrieved from the ROM 18 when bitmaps of the characters are rendered to be displayed as rendered images by a raster output device. Alternatively, such image descriptions and character outlines can be included in ROM or RAM within an output device, such as printer 24.

The peripheral bus 20 is used to access the input, output, and storage devices used by the digital computer 11. In the described embodiment, these devices include the display screen 22, the printer device 24, the floppy disk drive 26, the hard disk drive 28, and the network interface 30. The keyboard controller 32 is used to receive input from keyboard 34 and send decoded symbols for each pressed key to microprocessor 12 over bus 33.

The display screen 22 is an output device that displays images of data provided by the microprocessor 12 via the peripheral bus 20 or provided by other components in the computer system 10. In the described embodiment, the display screen 22 is a raster device which displays images on a screen corresponding to bits of a bitmap in rows and columns of pixels. That is, a bitmap can be input to the display screen 22 and the bits of the bitmap can be displayed as pixels. An input bitmap can be directly displayed on the display screen 22, or components of computer system 10 can first render codes or other image descriptions from a page description file into bitmaps and send those bitmaps to be displayed on the display screen 22. Raster display screens such as CRT's, LCD displays, etc. are suitable for use as the display screen 22.

The printer device 24 provides an image of a bitmap on a sheet of paper or a similar surface. The printer 24 can be a laser printer, which, like display screen 22, is a raster device that displays pixels derived from bitmaps. The printer device 24 can also print images derived from coded data such as found in a page description language file. Other output devices such as a plotter, typesetter, etc. can be used in place of or in addition to the printer device 24.

To display images on an output device, such as the display screen 22 or the printer 24, the computer system 10 can implement one or more types of procedures. One procedure is to transform coded objects into image descriptions. For example, the code for a text character is a portion of an image description which takes up less memory space than several copies of the bitmap of the recognized character. The text character code can include associated information which specify how the character is to be displayed, such as positional coordinates (i.e., x and y coordinates), size, font, etc. A well known page description language for specifying image descriptions is the PostScript® language, and a well known portable electronic document language for specifying image descriptions is the Portable Document Format (PDF) language. Both PostScript and PDF are available from Adobe Systems, Inc. of Mountain View, Calif. The image description can reference stored character outlines which describe the shape of the character and includes other rendering information. A well-known character outline format is the Type 1® format, by Adobe Systems, Inc. Using character outlines, computer system 10 can render a bitmap for each character and send the bitmap to a memory cache or other storage area that is accessible to an output device for display. In other embodiments, output devices such as printers can include microprocessors or similar controllers which can render a bitmap from character outlines. A page description language (PDL) file is a file or similar storage unit which includes objects of an image description stored in a page description language such as PostScript. A portable electronic document file is a file or similar storage unit which includes objects of an image description stored in a portable electronic document language such as PDF. A portable electronic document can include objects represented by a page description language, such as PostScript. A page description language file is thus considered a portable electronic document herein.

The floppy disk drive 26 and the hard disk drive 28 can be used to store bitmaps, image descriptions (coded data), and character outlines, as well as other types of data. The floppy disk drive 26 facilitates transporting such data to other computer systems, and hard disk drive 28 permits fast access to large amounts of stored data such as bitmaps, which tend to require large amounts of storage space.

The microprocessor 12 together with an operating system (not shown) operate to execute computer code and produce and use data. The computer code and data may reside on the RAM 16, the ROM 18, or the hard disk drive 28. The computer code and data could also reside on a removable program medium and loaded or installed onto the computer system 10 when needed. Removable program mediums include, for example, CD-ROMs, PC-CARDs, floppy disk and magnetic tape.

The network interface 30 is used to send and receive data over a network connected to other computer systems. An interface card or similar device and appropriate software implemented by the microprocessor 12 can be used to connect the computer system 10 to an existing network and transfer data according to standard protocols.

The keyboard 34 is used by a user to input commands and other instructions to the computer system 10. Images displayed on the display screen 22 or accessible to the computer system 10 can be edited, searched, or otherwise manipulated by the user by inputting instructions on the keyboard 34. Other types of user input devices can also be used in conjunction with the present invention. For example, pointing devices such as a computer mouse, a track ball, a stylus, or a tablet can be used to manipulate a pointer on a screen of a general-purpose computer.

A portable electronic document (i.e., PDF) file format allows objects, in particular text objects, to be placed at any position or rotation on a page. The arbitrary or generalized placement of text objects causes significant problems when highlighting text objects on a screen. In particular, conventional solutions to the double invert problem discussed above cause erroneous highlighting and/or sluggish performance. The invention, on the other hand, provides an improved technique to highlight text objects efficiently and reliably while avoiding any double inverts.

Figure 2:
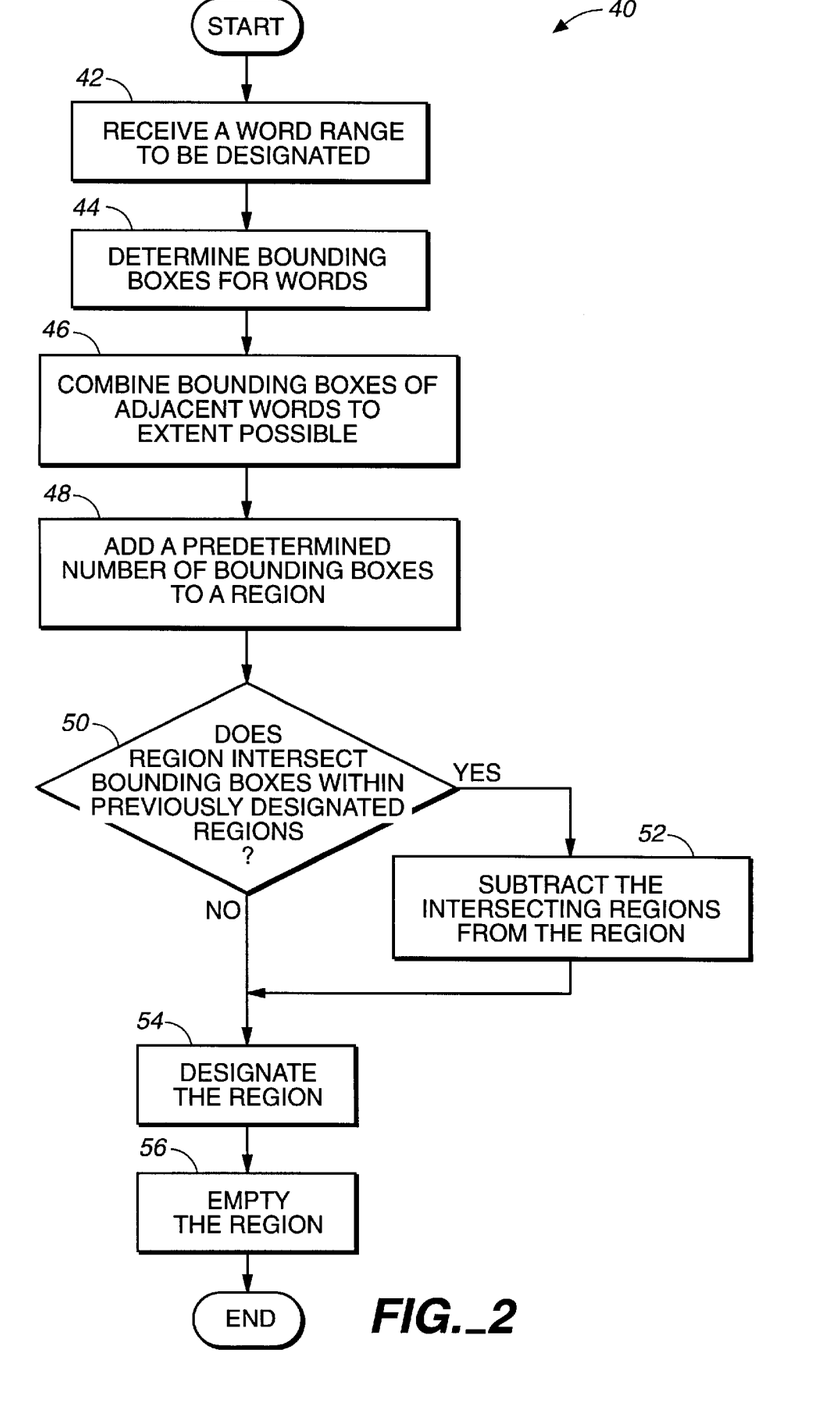
FIG. 2 is a flow chart of designation processing according to a first embodiment of the invention.

FIG. 2 is a flow chart of designation processing according to a first embodiment of the invention. The designation processing 40 is, for example, carried out by the computer system 10 illustrated in FIG. 1.

Initially, the designation processing 40 receives 42 a word range to be designated (i.e., highlighted). The word range refers to text objects on a page which are to be designated. The word range may be a single range of consecutive words, disjoint ranges of consecutive words, or disjoint isolated words. In any case, the word ranges identify the words on a page which are to be designated . Normally, the text on a page is defined as a series of numbered words. For example, a page might have 150 words, where the first word on the page is word number 1 and the last word on the page is word number 150. When text is to be designated on the page, the designating is typically described as designating a range of words. For example, designating a word range from 1 to 50, would designate the first fifty words on the page. The designating (i.e., highlighting) of the words would, of course, appear on the display screen 22.

Next, the designation processing 40 determines 44 bounding boxes for the individual words within the word range. A bounding box is a quadrilateral enclosing a word. For horizontal text, the bounding box is usually a rectangle. A preferred technique for determining the bounding boxes is described in detail in U.S. patent application Ser. No. 08/304,762 entitled "METHOD AND APPARATUS FOR IDENTIFYING WORDS DESCRIBED IN A PAGE DESCRIPTION LANGUAGE FILE" now abandoned, continued as application Ser. No. 08/884,004, entitled METHOD AND APPARATUS FOR IDENTIFYING WORDS DESCRIBED IN A PAGE DESCRIPTION LANGUAGE FILE, now abandoned and Ser. No. 08/304,678 entitled "METHOD AND APPARATUS FOR IDENTIFYING WORDS DESCRIBED IN A PORTABLE ELECTRONIC DOCUMENT" now abandoned continued as application Ser. No. 08/884,003, entitled METHOD AND APPARATUS FOR IDENTIFYING WORDS DESCRIBED IN A PORTABLE ELECTRONIC DOCUMENT, now abandoned both of which are hereby incorporated by reference in their entirety.

The bounding boxes of adjacent words are then combined 46 to the extent possible. Namely, adjacent words on a line of normal horizontal text are usually combined. In such cases, it is possible to obtain a combined bounding box that is associated with an entire line of text. However, when adjacent words on a line of horizontal text are separated by a distance greater than would be the case with related text of a sentence or paragraph, such as when columns are presented on a page, the bounding boxes would not be combined. The separation distance is determined from the coordinate points for the respective boxes.

Thereafter, a predetermined number of combined bounding boxes are added 48 to a region. For performance reasons, the region is prevented (by the predetermined number) from becoming too large. The size of the region is limited so that reliability results and large amounts of system resources are not required. A region is a common graphics object that can represent any shape. Initially, the region is empty. Then, up to a predetermined number of the combined bounding boxes are added 48 to the region.

Next, a decision 50 is made based on whether the region intersects bounding boxes for words within previously designated regions. The intersection of the region with bounding boxes for words within previously designated regions is determined using rectangle operations. That is, the coordinates of the bounding boxes associated with previous regions are compared against the coordinates of the bounding box corresponding to the region. If the region is determined to be intersected by the bounding boxes of previous regions, the intersecting region (or intersecting portion thereof) is subtracted 52 from the region. Preferably, up to a line of bounding boxes within the previous regions are first combined and then used to determine whether there is an intersection, thereafter another line is obtained and checked for intersection. This way only a simple rectangular region has to be created for the subtraction (or clipping) operation.

Following block 50 when the region does not intersect the bounding boxes of previous regions or following block 52, the region is designated 54. When the designating is highlighting, the region is inverted. Regions, like individual rectangles, can be inverted to indicate highlighting. Inverting is a graphic operation performed on a set of pixels on a display screen. That set may include only one pixel, all of the pixels inside a rectangle, or any possibly disconnected set of areas of the display screen. Inverting a pixel "reverses" its color.

The region is then emptied 56 so that it is available to determine a next region. Following block 56, the designation processing 40 is complete and ends.

Figure 3A:
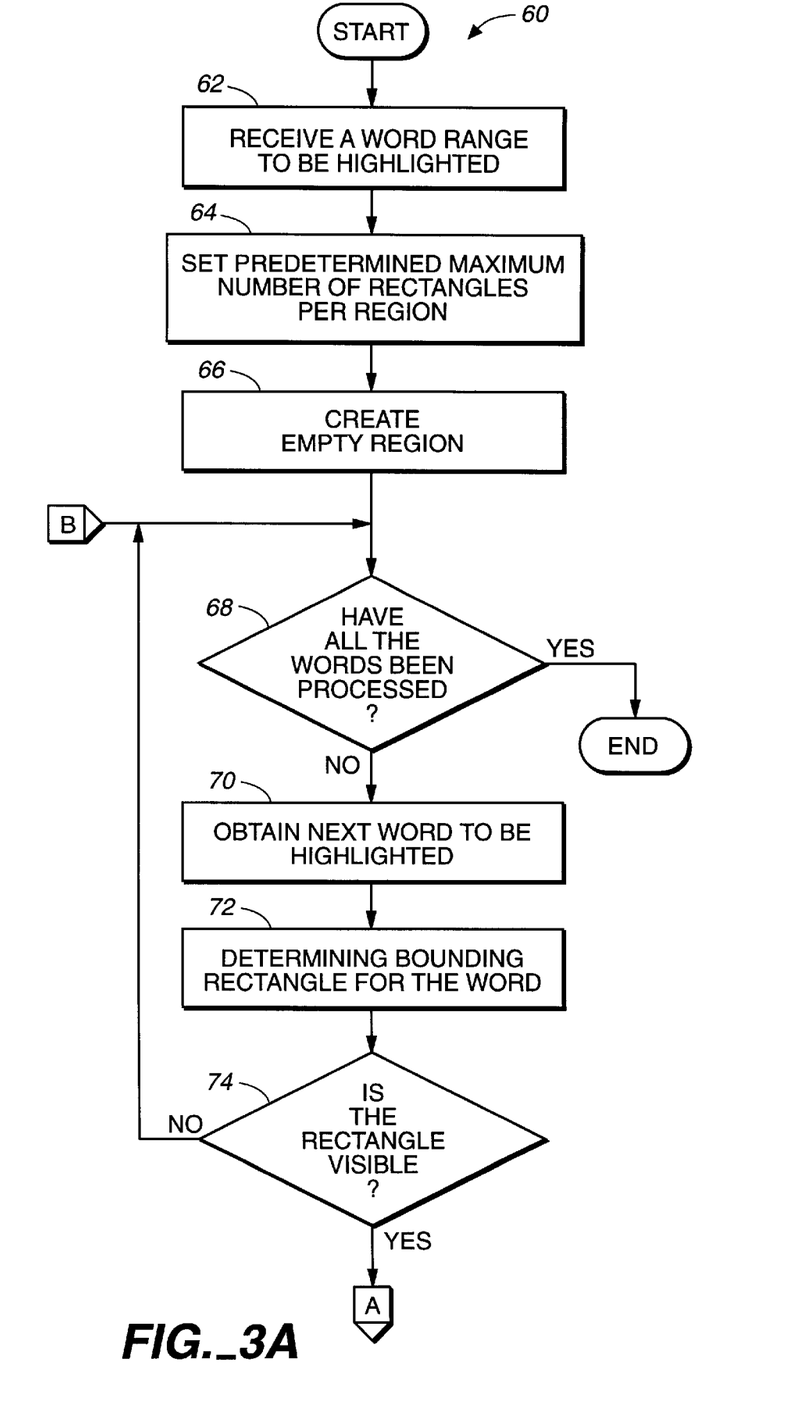
FIGS. 3A–3C are flow charts illustrating highlight processing according to a second and more detailed embodiment of the invention.
Figure 3B:
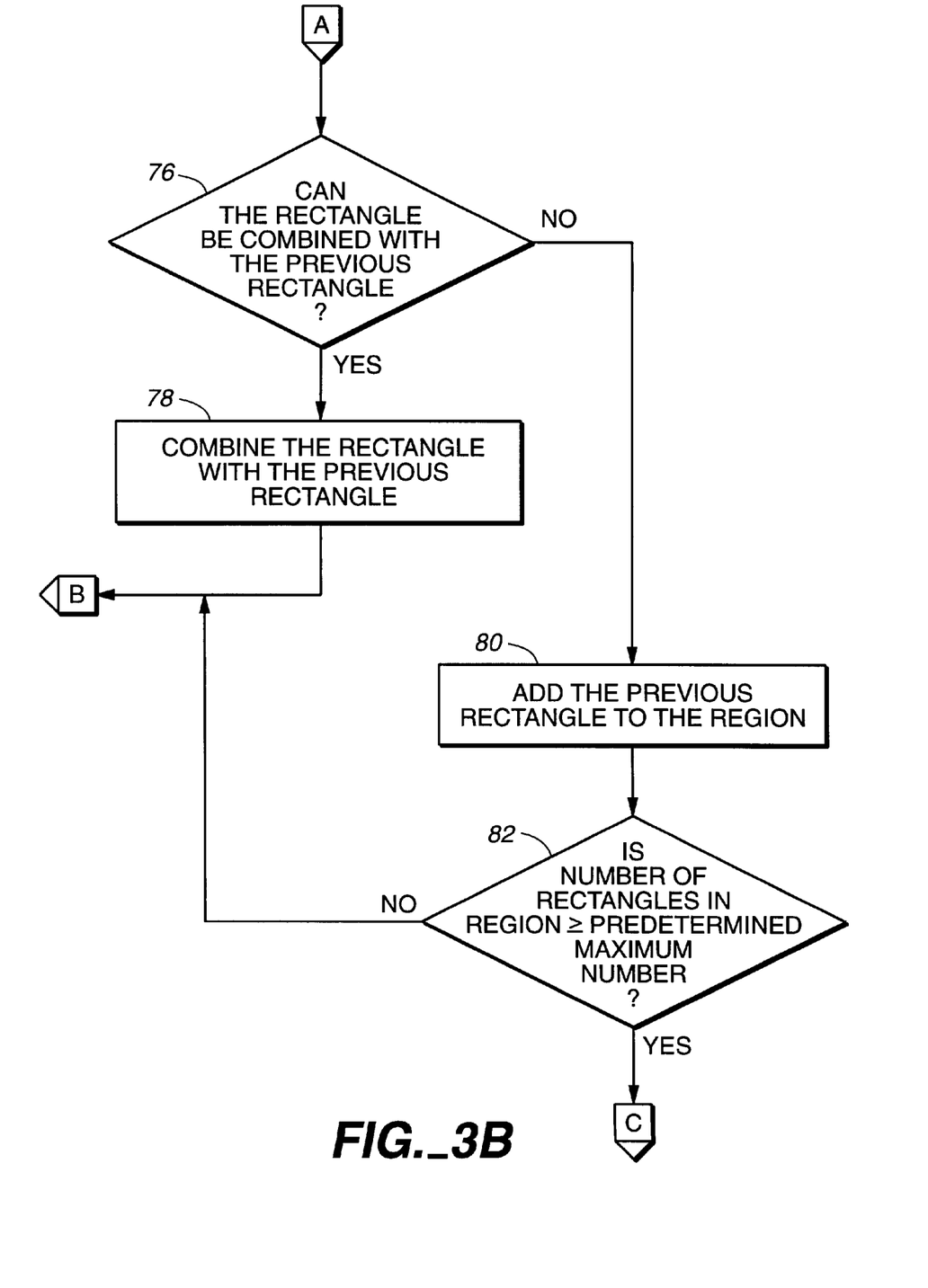
Figure 3C:
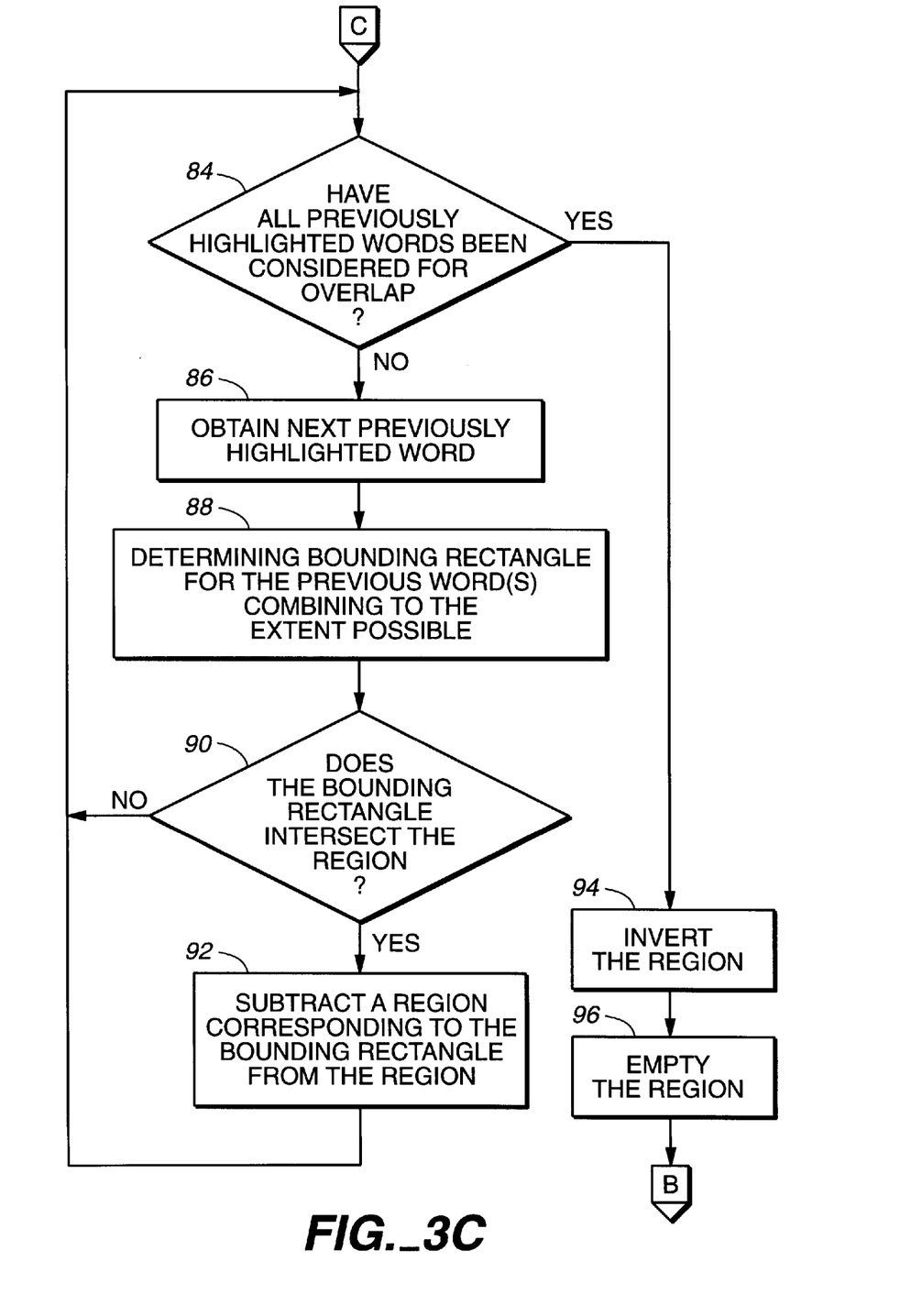

FIGS. 3A–3C are flow charts illustrating highlight processing 60 according to a second and more detailed embodiment of the invention. The highlight processing 60 is, for example, performed by the computer system 10 illustrated in FIG. 1.

Initially, the highlight processing 60 receives 62 a word range to be highlighted. The word range is, for example, denoted by a first word number and a last word number. The first word number indicates the first word on a page to be highlighted and the last word number indicates the last word on the page to be highlighted. All words on the page between the first word number and the last word number are also to be highlighted.

Next, a predetermined maximum number of rectangles per region is set 64. Preferably, the predetermined maximum number is set by the application program seeking to perform the highlighting based on what is suitable for an application program and the computer system. For example, experience has indicated that for Macintosh computer systems, a maximum number of 200 rectangles would be preferred, and for a Windows environment, a maximum number of 160 rectangles would be preferred. The maximum number could be lowered if system resources are low. An empty region is also created 66 to hold a next band of words to be highlighted at the same time. A band is the number of words that are represented by a region.

A decision 68 is then made based on whether all of the words that are to be highlighted have been processed. A word is considered to have been processed when the word is included within a region and thereafter highlighted as was requested. If all of the words have been so processed, the highlight processing 60 is complete and ends. On the other hand, if all of the words have not yet been processed, the highlight processing 60 continues. In particular, following decision block 68, the next word within the word range to be highlighted is obtained 70. A bounding rectangle for the word is then determined 72. As discussed above, the determining of a bounding rectangle is preferably determined as described in U.S. patent application Ser. Nos. 08/304,76 and 08/304,678 as mentioned above.

Following block 72, a decision 74 is made based on whether or not the bounding rectangle for the word is visible. If the bounding rectangle for the word is not visible on the display screen 22, then there is no need to perform any further processing on the word; hence, the highlight processing 60 returns to repeat block 68 and subsequent blocks. On the other hand, if the bounding rectangle for the word is visible, then the highlight processing 60 continues. Namely, a decision block 76 then determines whether the bounding rectangle can be combined with the previous bounding rectangle. Here, the combining of the rectangles is permitted if they are adjacent in a horizontal sense (i.e., on a horizontal line of text) and also close enough to each other so as to indicate that the words are associated with the bounding rectangles are adjacent words within a line of text. Preferably, the adjacent bounding boxes are combined only when the vertical heights are the same and the horizontal separation is less than or equal to the vertical height.

If the decision block 76 determines that the bounding rectangle can be combined with the previous bounding rectangle, then the bounding rectangles are combined 78. The combining of the bounding rectangles is a rectangle union operation that is well known in the art. Following block 78, the highlight processing 60 returns to repeat block 68 and subsequent blocks.

On the other hand, when the decision block 76 determines that the bounding rectangle cannot be combined with the previous bounding rectangle, the previous rectangle is added 80 to the region. The adding 80 of a bounding rectangle is achieved by a union operation. Preferably, the adding 80 includes two steps, namely (i) creating a temporary region equivalent to the bounding rectangle and (ii) unioning the temporary region with the region. Here, the previous rectangle has already been combined with other rectangles to the extent possible. Hence, the previous bounding rectangle is only added to the region when the previous bounding rectangle has been combined with other rectangles to the extent possible. The current rectangle which is not being combined with this bounding rectangle becomes the first bounding rectangle for the next iteration of the processing to combine adjacent bounding rectangles.

Following block 80, a decision block 82 determines whether the number of rectangles in the region is greater than or equal to the predetermined maximum number. The predetermined maximum number was set in block 64. When the decision block 82 determines that the number of rectangles within the region is not greater than or equal to the predetermined maximum number, then the highlight processing 60 continues for the particular region by returning to block 68 and subsequent blocks. On the other hand, if the number of rectangles in the region equals or exceeds the predetermined maximum number, then the region is deemed to be filled and no additional bounding rectangles may be added to the region. Subsequent words which are to be highlighted must then fall within a different region. When the region is complete or filled, a decision block 84 determines whether all previously highlighted words have been considered for overlap.

When all the previously highlighted words have not been considered for overlap, additional processing is carried out to identify if there are any overlapping regions and when overlapping regions are identified they are removed from the region. In particular, following decision block 84 when additional processing is needed, the next previously highlighted word is obtained 86. Here, the words that have already been highlighted are obtained 86 to check for any overlap with the current region. For performance reasons, the overlap checking is done with rectangle operations, instead of region operations. Hence, the bounding rectangle for the previous word or words is determined 88 while combining the bounding rectangles to the extent possible. The combining operation is the same as that discussed above with respect to blocks 76 and 78.

Next, a decision block 90 determines whether the bounding rectangle intersects the region. If the bounding rectangle for the previous word or words does not intersect the current region, then the decision block 84 and subsequent blocks are repeated to consider potential overlap by previous words. On the other hand, when the bounding rectangle does intersect the region, a region corresponding to the bounding rectangle for the previous word or words is subtracted 92 from the region. The subtraction operation is a region operation that removes the overlap portion from the region. Preferably, up to a line of text is combined into a combined bounding rectangle, then, when the combined bounding rectangle intersects the current region, a temporary region equivalent to the combined bounding rectangle is created, and then the intersecting portion is removed from the current region using a subtraction operation. Preferably, the subtraction operation is a union between the temporary region with the current region. This approach avoids expensive regions to the extent possible, thereby providing fast highlighting while avoiding double inverts.

After block 92 or after the decision block 84 when all the previous words have been considered, the region is inverted 94. Because the overlap portion was previously eliminated from the region, the inverting 94 of the region does not produce any double inverts. Following block 94, the highlight processing 60 empties 96 the region for the next iteration. Following block 96, the highlight processing 60 returns to block 68 and subsequent blocks to process a next region of text to be highlighted.

The processing for each region is done off-screen so that the display screen 22 is not modified until the region is correctly inverted. Namely, if the system resources are low such that the processing of the region cannot correctly complete, the display screen 22 has not yet been partially or inaccurately modified. When system resources are too low to process a region, the band size (region size) is preferably reduced in half (by reducing the predetermined maximum number in half) and the processing for the now smaller region is started over. The reduction in band size can continue to be reduced until the system resources are sufficient. As a result, the improved technique provided by the invention does not fail when system resources are low.

Figure 4A:
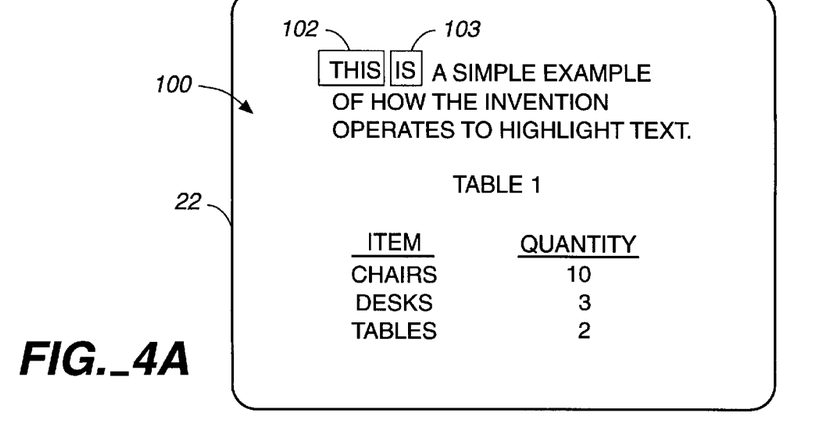
FIGS. 4A–4E are illustrations of the highlight processing performed on displayed images derived from a portable electronic document.
Figure 4B:
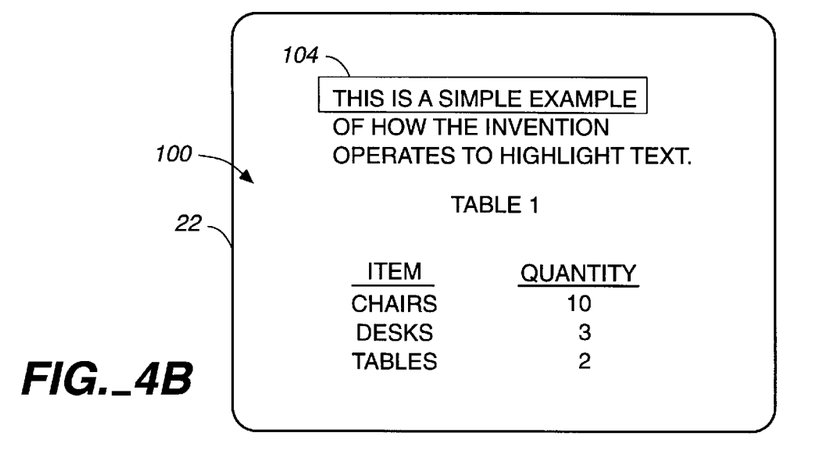

FIGS. 4A–4E are illustrations of the highlight processing 60 shown in FIGS. 3A–3C performed on displayed images derived from a portable electronic document 100. The displayed image in this simplified representative example includes a text paragraph and a table. In FIG. 4A, the obtaining 70 of the next word and the determining 72 of the bounding rectangle of the highlight processing 60 are illustrated. Specifically, the first word obtained 70 is the word "This" and the bounding rectangle 102 for the word "This" is then determined. Thereafter, the next word "is" is obtained 70 and its bounding rectangle 103 determined 72. In this example, all the bounding rectangles are visible. The bounding rectangle 102 and the adjacent bounding rectangle 103 are then combined 78 into a single bounding rectangle. In this example, the process repeats until the bounding rectangles of all the words in the first line of the portable electronic document 100 are combined into a bounding rectangle 104 as illustrated in FIG. 4B.

When the next word "of" in the portable electronic document 100 is obtained 70 and its bounding rectangle determined 72, the bounding rectangle is not combined with the bounding rectangle 104 because it is on a different horizontal line of text. The bounding rectangle 104 in this case has been combined to the extent possible and added 80 to the region.

Figure 4C:
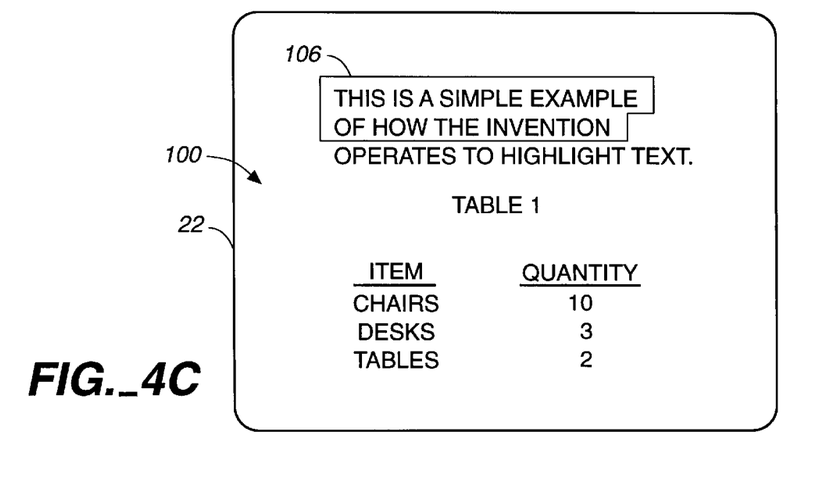

Thereafter, the processing operates to produce a bounding rectangle for the second line of the portable electronic document 100. The bounding rectangle for the second line of text (i.e., "of how the invention") is then added 80 to the region. The addition 80 is a region operation. The result of the region operation is a first region 106 associated with adding the bounding rectangles for the first and second lines of text and illustrated in FIG. 4C. Note that by combining rectangles to the extent possible with rectangle operations, the number of costly region operations is substantially reduced by the invention. Also, for this example, it is assumed that the predetermined number used in decision block 82 is two. Hence, the first region 106 illustrated in FIG. 4C is filled as it holds two rectangles. The first region 106 is then inverted 94 so as to highlight the text on the display screen 22. Although not illustrated, the inverting 94 would invert each of the pixels within the first region 106.

Figure 4D:
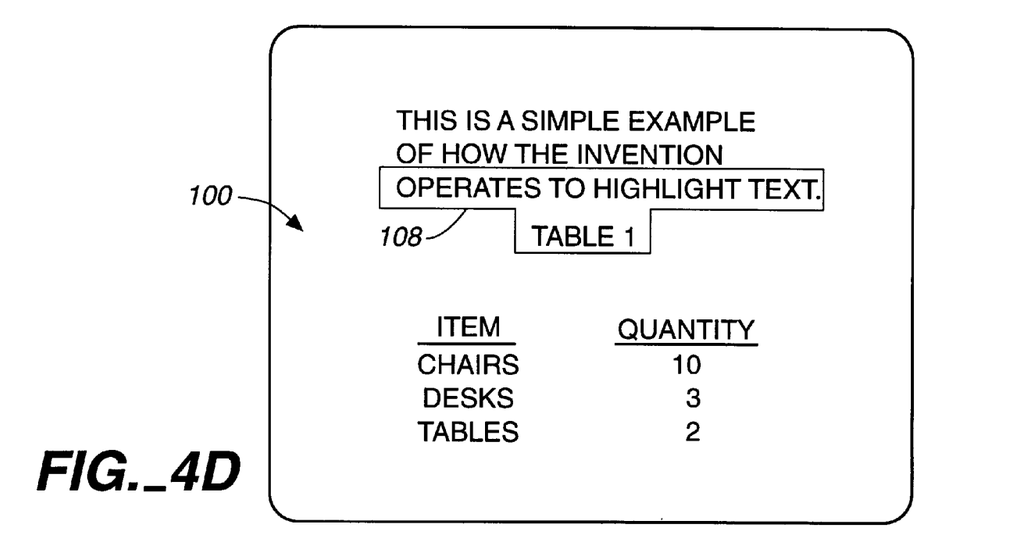
Figure 4E:
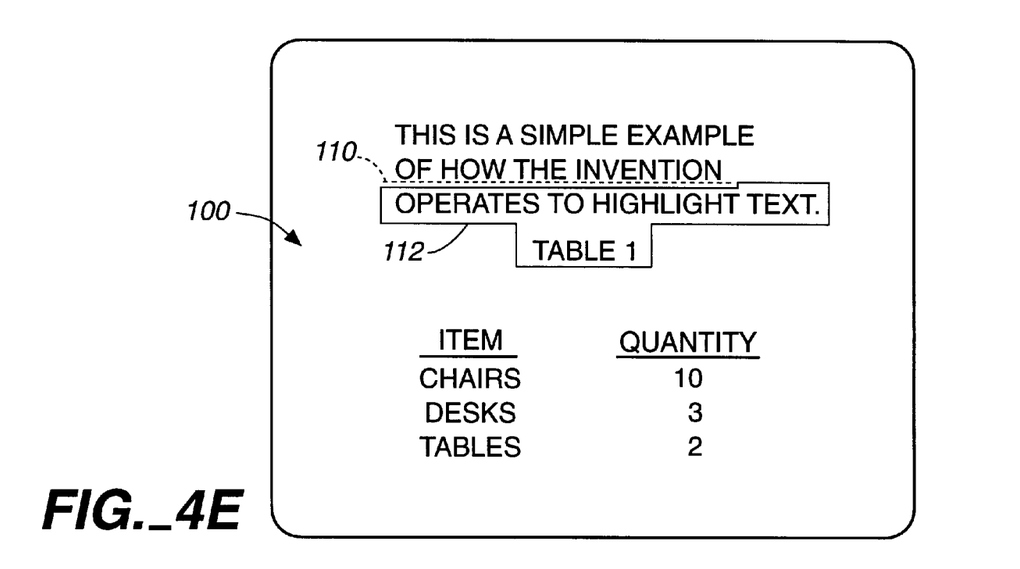

FIG. 4D illustrates a second region 108 formed from two bounding rectangles, the first of which results from the third line of text and the second of which results from the bounding rectangles for "Table 1". Here, since the first region 106 has already been displayed, the operations of blocks 84–92 must be performed before the second region 108 is inverted. Blocks 86 and 88 of the highlight processing 60 determine a first bounding rectangle of the previously inverted first region. Here, the bounding rectangle would be the bounding rectangle 104 shown in FIG. 4B. Then, decision block 90 determines that this bounding rectangle 104 of the previously inverted first region does not intersect the second region (i.e., the bounding rectangle for the second region) 108. Next, blocks 86 and 88 determine another bounding rectangle of the previously inverted first region, namely the bounding rectangle for the second line of text in the portable electronic document 100. The decision block 90 then determines that this bounding rectangle intersects the second region (i.e., the bounding rectangle for the second region). Thereafter, as shown in FIG. 4E, the bounding rectangle for the second line of text is subtracted 92 from the second region 108. As a result, an intersecting area 110 is removed from the second region 108, thus resulting a clipped region 112. Then, the clipped region 112 is inverted 94 so as to highlight the text in the second region 108 on the display screen 22 without un-highlighting any portion of the first region 106.

The highlight processing 60 for the remaining words in the portable electronic document 100 shown in FIGS. 4A–4E are not discussed. But it should be noted that the columns in the table (Table 1) of the document 100 are separated by a distance greater than normal separations of words in sentences or paragraphs of text documents. Hence, bounding rectangles corresponding to the words in the different columns would not be combined; instead, they would remain individualized. For example, the bounding rectangles for "Item" and "Quantity" would not be combined because at this point in the document they are not substantially contiguous. The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer-implemented method for highlight processing text objects within a document on a display screen of a computer system comprising:

(a) designating a first inverted region containing a first text object within a first bounding box;

(b) designating a second region within a second bounding box containing a second text object adjacent to the first text object;

(c) combining the bounding boxes in a manner which creates an overlap between them;

(d) identifying portions of the adjacent first and second bounding boxes which overlap; and (e) highlight processing the first and second text objects without reinverting either the contents of the first bounding box or the contents of the identified portions of the overlapping first and second bounding boxes.

2. A method as recited in claim 1, wherein said combining step (c) combines adjacent bounding boxes based on a separation distance between adjacent bounding boxes.

3. A method as recited in claim 1, wherein the objects are words.

4. A method as recited in claim 1, wherein the combining step (c) comprises:

(c1) determining whether the first and second bounding boxes are on a horizontal line;

(c2) determining whether the first and second bounding boxes determined in (c1) to be on a horizontal line are close enough to one another to be combined; and (c3) combining the first and second bounding boxes determined in (c2) to be close enough to be combined.

5. A system for highlight processing regions containing text objects on a display screen of a computer system comprising:

a portable electronic document file containing a plurality of text objects to be designated on the display screen, one of which text objects is inverted;

a bounding box builder for determining bounding boxes for each of the text objects;

a bounding box combiner for combining certain adjacent bounding boxes in a manner which creates an overlap between the combined bounding boxes;

an identifier for identifying portions of the combined bounding boxes which overlap;

an overlap clipper for removing the contents of the adjacent portions of the bounding boxes which overlap; and a highlight processor for modifying pixels on the display screen representing the text objects within the combined bounding boxes without reinverting the inverted text object or reinverting the contents of the identified portions of the overlapping adjacent bounding boxes, thereby highlighting the text objects.

6. A system as recited in claim 5, wherein the text objects being designated are words.

7. A computer readable medium containing program instructions for highlight processing text objects within a document on a display screen of a computer system comprising:

computer readable code for designating a first inverted region containing a first text object within a first bounding box;

computer readable code for designating a second region within a second bounding box containing a second text object adjacent to the first text object;

computer readable code for combining certain bounding boxes in a manner which creates an overlap between them;

computer readable code for identifying portions of adjacent first and second bounding boxes which overlap; and computer readable code for highlight processing the first and second text objects without reinvertinz either the contents of the first bounding box or the contents of the identified portions of the overlapping first and second bounding boxes.

8. A computer readable medium as recited in claim 7, wherein at least one of the bounding boxes is rotated.

* * * * *

UNITED STATES PATENT AND TRADEMARK OFFICE
CERTIFICATE OF CORRECTION

PATENT NO.     : 5,930,813

DATED          : 07/27/99

INVENTOR(S)    : Allan P. Padgett, et al.

It is certified that error appears in the above-identified patent and that said Letters Patent is hereby corrected as shown below:

Claim 3, line 61, after "the" insert --text--.

Signed and Sealed this

Thirtieth Day of November, 1999

Attest:

Q. TODD DICKINSON

Attesting Officer

Acting Commissioner of Patents and Trademarks